(No Model.)

A. J. THOMPSON.
DUMPING WAGON.

No. 515,628. Patented Feb. 27, 1894.

WITNESSES:
John A. Rennie
C. Sedgwick

INVENTOR
A. J. Thompson
BY
Munn & Co
ATTORNEYS.

UNITED STATES PATENT OFFICE.

ALFRED J. THOMPSON, OF KAUFMAN, ILLINOIS.

DUMPING-WAGON.

SPECIFICATION forming part of Letters Patent No. 515,628, dated February 27, 1894.

Application filed October 6, 1893. Serial No. 487,329. (No model.)

*To all whom it may concern:*

Be it known that I, ALFRED J. THOMPSON, of Kaufman, in the county of Madison and State of Illinois, have invented a new and Improved Dumping-Wagon, of which the following is a full, clear, and exact description.

The invention relates to farm wagons, and its object is to provide a new and improved dumping wagon, which is simple and durable in construction, designed for hauling broom corn and other matter and arranged for conveniently dumping the load.

The invention consists of a wagon body pivotally connected by links with the wagon truck and adapted to slide on inclined tracks, a rope attached at its ends to the under side of the said body, and a windlass over which passes the said rope.

The invention also consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1:
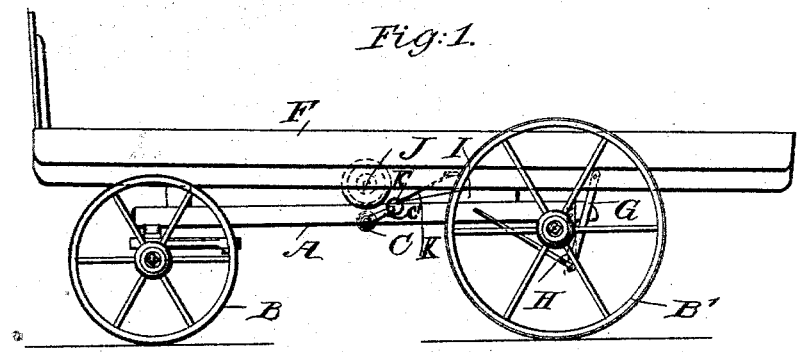
Figure 2:
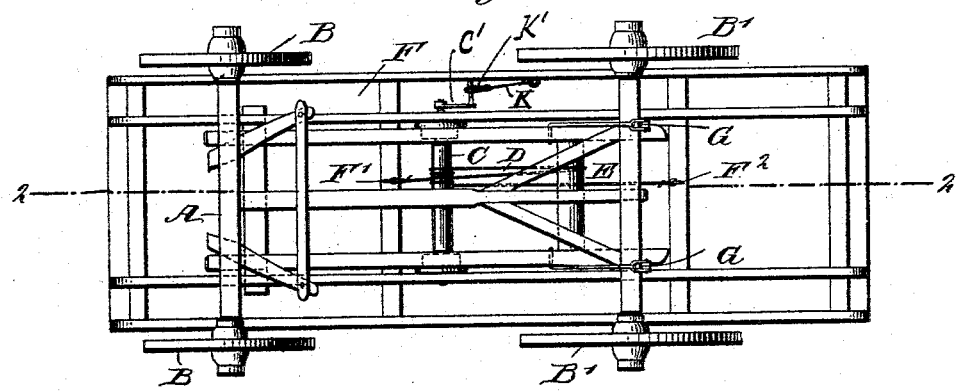
Figure 3:
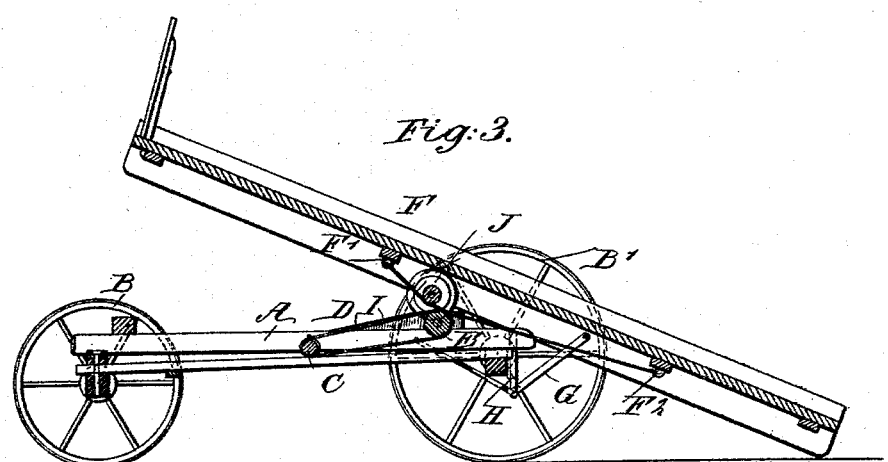

Figure 1 is a side elevation of the improvement. Fig. 2 is an inverted plan view of the same; and Fig. 3 is a sectional side elevation of the improvement on the line 2—2 of Fig. 2 and showing the body in a dumping position.

The improved dumping wagon is provided with a suitably constructed truck A, supported on the front and rear wheels B and B' respectively, as plainly shown in the drawings. In the side beams of the truck A, near the middle of the same, is journaled a windlass C on which winds a rope D, passing over a roller E, likewise journaled in the side beams of the truck A, but near the rear end of the same, as plainly illustrated in Figs. 2 and 3. One end of the rope D extends from the roller E upward to connect at F' with the under side of the wagon body F, adapted to be moved into an inclined position for dumping the load, as shown in Fig. 3. The other end of the rope D, after leaving the roller E, extends rearward and fastens at $F^2$ to the under side of the wagon body F near the rear end thereof.

The sides of the wagon body F are pivotally connected with links G extending downwardly to pivotally connect with posts H, depending from the rear end of the truck A, the said posts being braced, as shown in the drawings.

On the top surface of the side beams of the truck A are secured the inclined tracks I on which are adapted to travel flanged wheels J, journaled on the under side of the body F, so as to ease the rearward sliding of the wagon body F when dumping the same with its load.

The operation is as follows: When the several parts are in the position illustrated in Figs. 1 and 2, then the body F is supported on the truck A and a load can be put on top of the body in the usual manner. The wagon can then be run to the place of unloading, and when at the place of dumping the operator turns the windlass C by its crank arm C'. By turning the windlass C a pull is exerted on that end of the rope D connected at F' to the body F, so that the latter is drawn rearwardly and commences to swing downward, owing to the body's connection with the links G. The rearward movement of the body F causes the wheels J to travel up the inclined tracks I, so that the body readily assumes an inclined position and its load slides off the rear end to the ground. By turning the windlass C in the opposite direction, a pull is exerted on that end of the rope D connected at $F^2$ with the front end of the body F, so that the latter moves forward and swings downward until it finally assumes its normal position at the time the wheels J leave the forward lower ends of the inclined tracks I, see Fig. 1.

On one outer end of the windlass C is arranged the crank arm C' for conveniently operating the windlass C, as above described.

In order to prevent the body F from accidentally running backward, I provide a chain K attached to the side of the body F and adapted to engage, with its end ring K', the handle of the crank arm C', thus locking the latter in place and the body F to the truck.

Having thus described my invention, I claim as new and desire to secure by Letters Patent—

1. A dumping wagon, comprising a wagon body, links pivotally connecting the body with the wagon truck, a rope attached at its ends to the said body, a windlass on which winds the said rope, and fixed inclined tracks adapted for an operative engagement with the body to incline the same when it is drawn rearward, substantially as set forth.

2. A dumping wagon, comprising a wagon body, links pivotally connecting the said body with the wagon truck, a rope attached at its ends to the under side of the said body, a windlass on which winds the said rope, fixed inclined tracks, and flanged wheels journaled on the said body and adapted to travel on the said tracks, substantially as shown and described.

3. A dumping wagon, comprising a wagon body, links pivotally connecting the said body with the wagon truck, a rope attached at its ends to the under side of the said body, a windlass on which winds the said rope, and a roller journaled in the wagon truck and over which pass the ends of the said rope, substantially as shown and described.

4. A dumping wagon, comprising a truck, a windlass journaled in the said truck, a roller journaled in the said truck in the rear of the windlass, a wagon body adapted to be supported on the said truck, a rope fastened with its ends to the under side of the said body, and passing over the said roller and winding on the said drum, and links pivotally connecting the said truck with the said body, substantially as shown and described.

5. A dumping wagon, comprising a truck, a windlass journaled in the said truck, a roller journaled in the said truck in the rear of the windlass, a wagon body adapted to be supported on the said truck, a rope fastened with its ends to the under side of the said body, and passing over the said roller and winding on the said drum, links pivotally connecting the said truck with the said body, inclined tracks on the side beams of the said trucks, and wheels journaled on the said body and traveling on the said tracks and side beams of the truck, substantially as shown and described.

ALFRED J. THOMPSON.

Witnesses:
W. F. WAYNE,
R. C. WAYNE.